Jan. 19, 1954      W. H. KLIEVER      2,666,584
COMBUSTION CONTROL APPARATUS
Filed Dec. 18, 1950
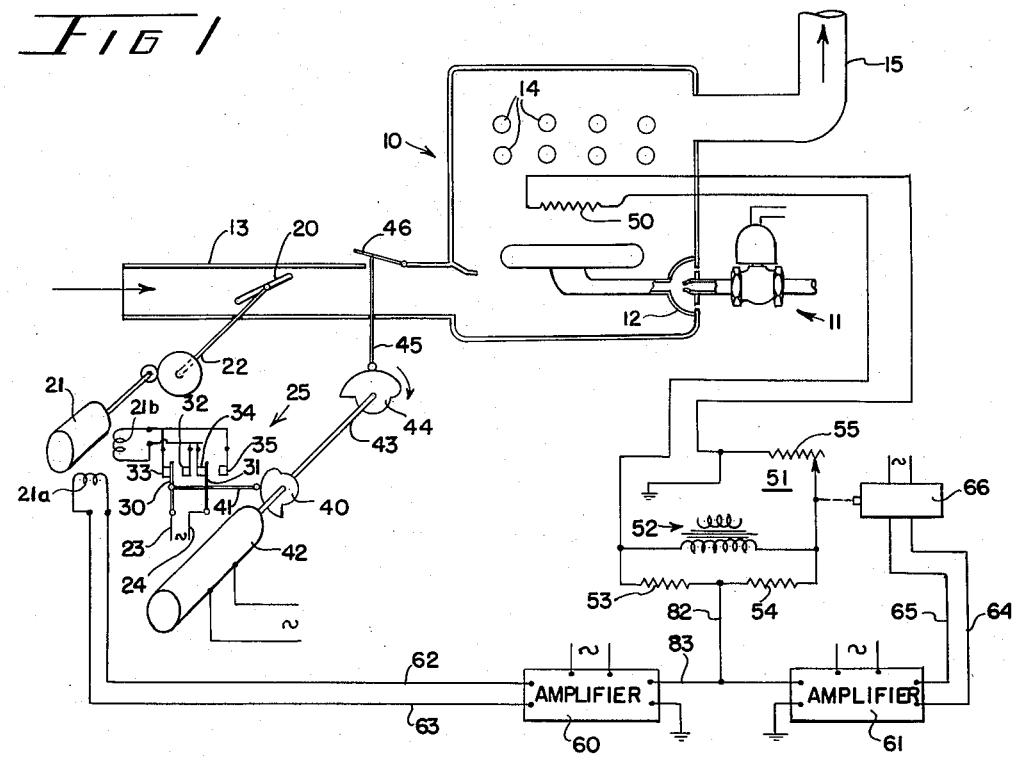
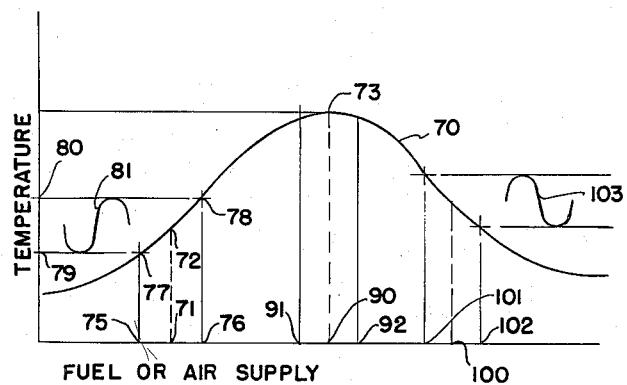
INVENTOR.
WALDO H. KLIEVER
BY
*George H. Fisher*
ATTORNEY.

Patented Jan. 19, 1954

2,666,584

UNITED STATES PATENT OFFICE 2,666,584

COMBUSTION CONTROL APPARATUS

Waldo H. Kliever, Minneapolis, Minn., assignor to Minneapolis-Honeywell Regulator Company, Minneapolis, Minn., a corporation of Delaware Application December 18, 1950, Serial No. 201,330

12 Claims. (Cl. 236—15)

The present invention is concerned with a combustion control apparatus for a burner. More particularly, it is concerned with a control for maintaining the operating temperature of a fuel burner at a maximum value.

In certain types of fuel burning apparatus it is desired that the combustion process be maintained at maximum efficiency and the output temperature of the apparatus always be maintained at a maximum value regardless of the type of fuel consumed or the rate at which the fuel is fed into the apparatus. This necessitates the provision of an apparatus for sensing the temperature in the fuel burning apparatus and further apparatus for controlling the flow of one of the products of combustion so that it is possible to adjust this flow to maintain the burner temperature at a maximum.

It has been found that when there is a constant flow of one of the products of combustion into a burner, i. e., the air or fuel, the variation of the other of the components from a minimum value to a maximum value will cause the burner temperature to pass through a maximum. It is this characteristic which is used in the present apparatus for controlling fuel or air flow of a combustion process to maintain a maximum temperature. By cyclically varying the flow by small increments, it is possible to "feel" the way adjustments must be made by the apparatus in order that a maximum temperature be maintained.

It is therefore an object of the present invention to provide an apparatus for maintaining a maximum temperature in a fuel consuming apparatus.

Another object of the present invention is to provide a combustion process control apparatus wherein one of the components of the combustible mixture is varied to a point necessary to maintain maximum combustion temperature.

Still another object of the present invention is to provide a control apparatus wherein one of the components of a combustible mixture is cyclically varied to cause a cyclic variation in the burner temperature to obtain a control signal for adjusting the mixture.

A further object of the present invention is to provide a control apparatus wherein a maximum temperature is to be maintained even though the quantity or type of the noncontrolled component of the combustible mixture flowing into the control burner varies.

A further object of the present invention is to provide a control apparatus wherein an electrical control apparatus has an electrical temperature responsive bridge which is maintained effectively balanced while the bridge is producing a signal for causing said apparatus to maintain the combustion process temperature at a maximum.

These and other objects of the present invention will be understood upon considering the following specification and the appended drawing of which:

Figure 1 shows schematically one arrangement in which the control apparatus may be constructed; and Figure 2 shows graphically the principle which permits the operation of the present apparatus.

Referring to Figure 1, the numeral 10 represents a furnace of any desired type wherein is located suitable burner mechanism. Supplying fuel to the furnace 10 is a conduit and valve assembly 11 which conducts the fuel to a suitable mixing unit 12 where the fuel is mixed with primary air and then to a burner positioned within the furnace 10. Secondary air or any other suitable medium is supplied to the mixing unit 12 through a conduit 13. The combustion process will take place above the burner and the combustion products will pass through a plurality of heat exchange conduits 14 and from there out through an exhaust stack 15.

For modulating the flow of the secondary air through the conduit 13, a damper 20 is provided. This damper is arranged to be positioned by a two phase reversible motor 21 having an amplifier phased winding 21a and a line winding 21b which when energized will cause rotation of the motor in a direction depending on the phase relation of the voltages on the windings. The motor 21 is connected to the damper 20 through a suitable driving means 22. A pair of power line connections 23 and 24 are connected to a reversible switching mechanism 25 to the line phase winding 21a of the motor 21. The reversing switch mechanism 25 comprises a pair of switch blades 30 and 31 which are arranged to move between a pair of contacts 32, 33, 34 and 35. The switch assembly 25 effectively reverses the electrical connection of the line phase winding 21b of the motor 21 to the input power lines 23 and 24. The operating energy for the switching mechanism 25 is obtained from a cam 40 which operates upon a follow up member 41. The cam 40 is arranged to be driven by a continuously operating motor 42 which, through a suitable driving connection 43, drives a further cam 44.

The cam 44 has riding thereon a cam follower member 45 which is mechanically connected to a damper member 46, the latter of which is arranged to be cyclically opened and closed, or varied, with the operation of the motor 42 and the resultant driving of the cam 44. Each of the cams 40 and 44 have a semi-circular dwell section and are so arranged that the respective followers will be in one position for half of a revolution of the cam and in another position for the subsequent half.

For sensing the temperature of the fire within the furnace 10 there is provided a suitable temperature responsive resistance element 50 which is connected as one leg of a bridge network 51. The power for the bridge network 51 is supplied by a transformer 52 and the network, in addition to the resistor 50, comprises further, a pair of fixed resistors 53 and 54 and a reset rheostat 55.

The output of the network 51 is connected to the input of a pair of amplifiers 60 and 61 both of which may be of the discriminator type which supply an output which varies both in phase and amplitude depending on the direction of unbalance of that input circuit and the amount of unbalance thereof. Such an amplifier is shown and described in the Albert P. Upton Patent No. 2,423,534, issued July 8, 1947. The output of the amplifier 60 is fed through a pair of leads 62 and 63 to the amplifier winding 21a of the reversible motor 21. The output of the amplifier 61 is connected by a pair of leads 64 and 65 to reset motor 66, said reset motor being of the reversible type and being arranged to drive the slider of the potentiometer 55.

*Operation*

In considering the operation of the present apparatus, reference should first be made to Figure 2. Figure 2 shows in graphical form what happens to the burner temperature as the fuel or air supply is varied from a minimum value to a maximum value while the other component, air or fuel, depending upon which is varied, remains flowing at a substantially constant value. The temperature curve is represented by the curve 70. Fuel or air supply is plotted on the abscissa of the graph and the furnace temperature is plotted on the ordinate of the graph. Obviously the configuration will vary, depending upon the types of fuel used and whether fuel or air flow is varied.

Assuming that the air supply is being varied with the fuel supply being substantially constant and assuming that the air flow is represented on the graph of Figure 2 as at the point 71, the furnace temperature will be represented by the intersection of a vertical line drawn from the point 71 and will intersect the temperature curve 70 at 72. Inasmuch as it is desired that the furnace temperature be maintained at a maximum value, which is by Figure 2 considerably higher at point 73, it is desired that a corrective signal be obtained and used to change the air flow so that the maximum temperature at point 73 will be obtainable. Referring now to Figure 1, it will be assumed that the damper 20 is in the position in which it is shown upon the drawing and that the cycling motor 42 is continuously operating. The cycling motor 42 is arranged to drive the associated cams 40 and 44 at a speed of approximately 12 R. P. M., or one revolution every five seconds. The rotation of the cam 44 will cause the follower 45 to operate upon the cycling damper 46 so that there will be a resultant change in the air flow to the furnace 10. When the follower 45 is on the raised portion of the cam 44 the cycling damper 46 will be opened and there will be a greater amount of air flowing into the furnace. When the follower 45 is riding on the down dwell portion of the cam 44, the cycling damper will be effectively closed so that the air flow will be decreased.

As the cycling damper 46 operates, assuming that the flow control damper is remaining stationary, the secondary air supply will be effectively varied between the points 75 and 76 on the air supply temperature curves shown in Figure 2. The vertical projection of these points will cause an intersection of the temperature curve 70 at points 77 and 78. The horizontal projection upon the temperature axis of the points of intersection 77 and 78 on the temperature curve 70 indicate that the temperature in the furnace will vary from point 79 to 80. Inasmuch as the cycling motor 42 is continuously operating there will be a cyclic variation in the temperature of the furnace and this cyclic variation is as represented by the curve 81. Assuming that the air flow starts at the point shown on the air supply axis 71 and decreases to point 75 and then increases to 76 and then back to 71, there will be a particular phasing of the temperature variation in the furnace 10 and, as shown in drawing in Figure 2, will be a cosine wave.

Referring back to Figure 1, it will be noted that the cycling motor 42 drives the cam 40 which in turn, through the follower 41, operates upon the switching mechanism 25. The rate of operation of this switching mechanism is the same as the rate of operation of the cycling damper 46. The operation of the switching mechanism 25 will cause the reversible motor 21 to have its line phase winding reversibly energized twelve times per minute.

Considering now the fact that the burner temperature is varying in a cycling manner at 12 cycles per minute, it is desired to coordinate this temperature variation with the cyclic variation on the line phase winding 21b of the motor 21. This is accomplished by the temperature responsive resistance element 50 whose resistance is arranged to vary with changes in the furnace temperature. The network 51 will accordingly have an electrical output which varies at a cyclic rate and this will be fed from the network through the conductors 82 and 83 into the input of amplifier 60.

Assuming that the bridge 51 is balanced, the output voltage will vary at the rate of 12 cycles per minute and the alternating current phasing of the 60 cycle per second power supply will be reversed at this rate of 12 cycles per minute. This reverse phasing of the 60 cycle signal at 12 cycles per minute will, when coordinated with the switch mechanism 25, operate to drive the motor 21 in a direction to increase the air supply. In other words, during the half cycle of the 12 cycle per minute signal when the output phasing of the amplifier 60, when compared with the phasing of the line signal fed through the switching mechanism 25 is acting upon the motor 21, it will cause the motor to be driven in a direction to increase air flow. On the following half cycle of the 12 cycle per minute signal, the change in resistance of resistor 50 will unbalance the bridge in the opposite direction and the output phasing of the amplifier 60 will be reversed. At the same time, the operation of the switching mechanism 25 will reverse the line phasing of the A. C. power signal on the motor 21 so that the net result of the signal from the amplifier and from the line will cause the motor 21 to continue to rotate in the same direction to increase air supply. The cam 40 is so mounted that the operation of the switching mechanism 25 lags behind the operation of damper 46 by the same amount of time as the lag in the response of resistor 50. Stating this in slightly different language, the amplifier 60 will have an output signal which will be 60 cycles per second. When the temperature of the burner is not at a maximum, and if the bridge 51 is effectively balanced, the phasing of this 60 cycle per second signal will be reversed every time the cycling damper opens and closes and the temperature of resistor 50 increases and decreases due to the fact that the bridge 51 is unbalanced first in one direction and then in the other. The frequency of this phase reversal will be 12 cycles per minute as the cycling damper is operated at a rate of 12 cycles per minute. It should be noted that there is no positive synchronization of the 12 cycle per minute signal with the 60 cycle per second signal. If the 60 cycle per second signal which has its phase reversing at a rate of 12 cycles per minute is fed from the amplifier to the amplifier winding 21a of motor 21, the 60 cycle signal will cause the motor to run in one direction during one-half cycle of the 12 cycle per minute signal or when the 60 cycle per second signal is of a first phase with the phasing of the line winding 21b remaining fixed. On the subsequent half-cycle of the 12 cycle per minute signal, the phase of the 60 cycle per second signal on the amplifier winding of the motor will reverse and if the line winding 21b has the same phasing, the motor will reverse its direction of operation. It is desirable, however, to cause the motor to rotate in the same direction when the phasing of the 60 cycle signal reverses on the output of the network 51. To do this, the switch 25 is effective to reverse the line phase winding energization every one-half cycle of the 12 cycle per minute operation and this is synchronized with the phase reversals from the amplifier 60 or the network 51. When this is done, it is possible to maintain the net 60 cycle phase relation between the amplifier winding 21a and the line winding 21b of the motor the same so that rotation of the motor will be in one direction. The motor will operate in a direction to increase the air supply by movement of the damper 20.

The increased air supply will cause an increase in the temperature of the fire and of the resistor 50. This increase in temperature of resistor 50 will unbalance the network 51 and this unbalance, without further adjustment of the network 51, will result in the 12 cycle variations in bridge output being a modulated 60 cycle phase. This modulated 60 cycle signal of one 60 cycle phase when amplified and applied to motor 21 with the reversing of the phasing of the line phase winding 21b will tend to cause the motor 21 to oscillate about a fixed point in accordance with the 12 cycle variations because of the operation of the line phase reversing switch 25. To correct for this, the amplifier 61 and reset motor 66 are provided. The reset motor 66 is arranged to drive the slider of the rheostat 55 at a relatively slow speed so that the motor 66 will not try to follow the 12 cycle variations in the network 51. However, the average balance of network 51 is sensed and responded to so that motor 66 adjusts rheostat 55 to maintain the network 51 in an effectively balanced condition so that the cyclic variations of the temperature will cause the 60 cycle modulated wave to reverse in phase every half cycle. While the temperature of the furnace is displaced from the maximum and the motor 21 is changing the air supply, the reset motor 66 will be readjusting the rheostat 55 to maintain the network 51 effectively balanced. The operation of the reset motor 66 may be considered in slightly different language by recognizing first that if the network 51 is considerably unbalanced, the 12 cycle per minute variation in the temperature resistor 50, due to operation of the damper 46, will not be sufficient to cause a phase reversal in the 60 cycle per second output signal of the network 51. Thus, the phase of the signal fed to motor 66 from amplifier 61 will remain constant and the motor 66 will operate in one direction. As the network 51 approaches balance, the cyclic variation of resistor 50 will cause the phasing of the output of the network to reverse for a time period depending upon how far the network is unbalanced in the opposite direction by the resistor 50. If the time period of unbalance is greater with one phase of unbalance than for phase unbalance of the opposite sense, the phasing which is in existence for the longest period of time will cause the net energization and rotation of motor 66 to be in a direction which will tend to eliminate the time period difference between the unbalance on either side of the main balance point of the network.

The apparatus will continue to operate in this manner until such time as the motor 21 has moved the damper 20 to a point so that there is no longer any cyclic variation in the temperature within the furnace. This air supply point, referring to Figure 2, will be represented by the point 90. The cyclic operation of the damper 46 will cause the air flow to vary between the points 91 and 92. It will be noted that the vertical projections to the points 91 and 92 to the temperature curve 70 indicate they intersect the temperature curve at substantially the same values on either side of the maximum temperature point 73. This will mean that the 60 cycle signal phase reversal in bridge 51 caused by the 12 cycle per minute operation of damper 46 will result in a very small output voltage from the bridge and hence in a very small voltage being supplied to amplifier winding 21a. Thus with the energization of line winding 21b reversed periodically, the motor 21 will either have a very small hunt about point 90 if the sensitivity of the system is high or remains stationary if the system sensitivity is low.

In the event that the air supply should be too great, for example at point 100 as shown in the graph of Figure 2, it is desired that the motor 21 be driven in the reverse direction to cut down the air supply. If the average air supply is at the point 100, and the cyclic damper 46 is being operated, the air supply will be varied between points 101 and 102 which points, when projected to the curve 70 will produce a temperature output curve substantially as shown at 103. In the present situation, starting with the air flow at point 100, closing the damper 46 to point 101 and then opening the same to point 102 and thence back to 100 will cause the output wave 103 to be effectively 180° reversed from the phasing which is obtained when the air supply is less than that necessary to produce maximum temperature. The resultant 12 cycle per minute modulation of the network 51 will cause the output thereof to vary cyclically and appear as a 60 cycle signal which is reversing in phase every half cycle of the 12 cycle modulating signal. This signal when applied to the amplifier winding 21a and when combined with the line signal fed through the switching mechanism 25 will drive the motor 21 in a direction to decrease air supply. The motor 21 will continue to operate until such time as the air supply at its mean value is approximately at the point 90 shown upon Figure 2.

In the event that the quantity of fuel or the type of fuel fed to the mixture unit 12 in the furnace 10 should be varied, it will be obvious that the maximum temperature of the furnace will vary and may require a different quantity of air supply in order to obtain a maximum temperature. Inasmuch as any type or quantity of fuel in the air supply therefore is varied will produce a temperature curve upon combustion comparing to that of Figure 2, the apparatus will always adjust the control damper 20 so that the furnace temperature will remain at a maximum. To compensate for time lag in the system and to synchronize the temperature measurement with the cyclic operation of the damper 46, adjustment of the relative position of cams 40 and 44 on their driving shaft 43 is necessary.

It should be understood that while the apparatus is shown adjusting air supply with the fuel supply being assumed constant, the apparatus would work satisfactorily if the air supply were constant and the fuel supply were cyclically varied. Further, the cyclic variation can be made in one of the elements used in the combustion process while the flow control can be made on the other of the components of the combustion process. Further, the apparatus is for use in any type of combustion control such as a combustion engine or other similar apparatus.

While many modifications will be obvious to those skilled in the art, it is intended that the scope of the present invention be limited solely by the appended claims in which I claim:

1. Combustion control apparatus comprising, fluid flow control means, fluid flow cycling means for continuously cycling said fluid flow, a balanceable electrical network having therein a resistor responsive to combustion temperature and the cyclic variations therein caused by said cycling means, said network having rebalancing means, discriminating amplifying means connecting said network in controlling relation to said fluid flow control means, and reversible electric switching means actuated by said cycling means controlling the direction of operation of said fluid flow control means with said amplifying means.

2. Combustion control apparatus comprising, fluid flow controlling means, fluid flow cycling means for continuously cycling the fluid flow, a balanceable electric network having therein a resistor responsive to combustion temperature and the cycling variations therein caused by said cycling means, discriminating amplifying means connecting said network in controlling relation to said fluid flow controlling means, reversible electric switching means actuated by said cycling means and controlling the direction of operation of said fluid flow controlling means with said amplifying means, and a slow acting reversible electric motor means connected to said network to rebalance said network to a balanced condition after a period of time longer than the time of each cyclic operation of said cycling means.

3. In control apparatus for a combustion process where variations in a fluid flow will cause combustion temperature to pass through a maximum value, the combination including fluid flow regulating means, temperature change responsive apparatus comprising a first device adapted to respond to combustion temperature and a second device effective slowly to balance the effect of said first device so that said temperature change responsive apparatus is responsive to the rate and direction of change of combustion temperature, means for cycling the fluid flow, and means including switching means controlled by said temperature change responsive apparatus for adjusting said fluid flow regulating apparatus until the cycling of the fluid flow causes no appreciable change in the combustion temperature.

4. In control apparatus for a combustion process where variations in a fluid flow will cause combustion temperature to pass through a maximum value, the combination including fluid flow regulating means, temperature change responsive apparatus comprising a first device adapted to respond to combustion temperature and a second device effective slowly to overcome the effect of said first device so that said temperature change responsive apparatus is responsive to the rate and direction of change of combustion temperature, means for cycling the fluid flow, and means controlled by said temperature change responsive apparatus for adjusting said fluid flow regulating apparatus until the cycling of the fluid flow causes no appreciable change in the combustion temperature, said last named means comprising motor means having a pair of control windings, one of which is energized by said change responsive apparatus and the other of which is cyclically reversed in phase energization at a rate corresponding to the rate of cycling of the fluid flow.

5. In control apparatus for controlling the relative supplies of fuel and air to a combustion process comprising, means for controlling the supply of fuel to the combustion process, means including a reversible motor for controlling the supply of air to the combustion process, said motor having first and second energization windings, a source of voltage, means including a second motor for cyclically controlling at a predetermined cycling rate the supply of air to the combustion process, reversing switch means, means connecting said second motor means in cyclical operative relation to said reversing switch means, said switching means being cycled at said predetermined rate, electrical connection means including said reversing switch means for connecting said second winding of the reversible motor means to said source of voltage so that the phase of the voltage that is applied to said winding will be cyclically reversed, a balanceable electrical network circuit having an output, a temperature responsive impedance element responsive to the temperature of the combustion process, said temperature responsive element being connected in one leg of said network circuit, a variable impedance connected in an adjacent leg of said network circuit, slow operating third motor means, means connecting the output of said balanceable electrical network in controlling relation to said third motor means, said third motor means being connected in operative relation to said variable impedance so that upon the unbalance of said network circuit said third motor means will readjust said variable impedance to rebalance said circuit at a rate slower than the rate of unbalance of said network circuit caused by the effect of said cyclical supply of air to the combustion process upon said temperature responsive element relay means, additional electrical connection means including said relay means for connecting the output of the network circuit in controlling relation to said first winding of the reversible motor means so that upon an increasing temperature of the combustion process resulting from the cyclical increase in air supply, said reversible motor means will increase the amount of air flowing to the combustion process.

6. In control apparatus for controlling the relative supplies of fuel and air to a combustion process, means for controlling the supply of fuel, means including reversible motor means for variably controlling the supply of air, means including motor means for cyclically varying the proportional supplies of fuel and air, a balanceable electrical network circuit, said network circuit having an output, said network circuit including a temperature responsive means responsive to the temperature of the combustion process connected in one leg of the circuit, said circuit also including a variable impedance means connected in an adjacent leg of said network circuit, slow operating motor means for adjusting said variable impedance means, means connecting said output in controlling relation to said slow operating motor means so that upon the unbalance of said network circuit said slow operating motor means will adjust said impedance in a manner to effectively rebalance said network circuit means, relay means, electrical connection means including said relay means for connecting the output of said electrical network circuit in controlling relation to said reversible motor means, and reversing switch means for reversing the operation of said reversible motor means.

7. In control apparatus for controlling the relative supplies of combustion supporting materials to a combustion process, means for controlling the supply of one of said materials, means including reversible motor means for variably controlling the supply of another of said materials, means for cyclically varying the supply of one of said materials relative to the supply of the other of said materials, a balanceable network circuit means, said circuit including temperature responsive means having an electrical output signal indicative of the temperature of the combustion process, slow operating motor means, a variable impedance connected in said circuit means, said slow operating motor means being connected in adjusting relation to said variable impedance so that upon an unbalance of said network circuit said motor means will operate to vary said impedance in a manner to restore the balance of said network circuit, relay means, reversible switching means, electrical connection means including said relay means for connecting said network circuit means in controlling relation to said reversible motor means, and further electrical means connecting said switching means in controlling relation to said reversible motor means.

8. In control apparatus for controlling the relative supplies of combustion supporting materials to a combustion process, means for controlling the supply of one of said materials, means for controlling the supply of another of said materials, means for cyclically varying at a predetermined rate the supply of one of said materials relative to the supply of the other of said materials, balanceable means having a temperature responsive element sensitive to the temperature of said combustion process and also including a relatively slow acting rebalancing member for adjusting said balanceable means to a state of equilibrium when a change in temperature of said combustion process causes an unbalance, driving means for operating said means for controlling the supply of another of said materials, connection means operatively connecting said balanceable means in controlling relation to said driving means, and reversing means for reversing at said predetermined rate the effect of said balanceable means on said driving means.

9. In control apparatus for controlling the relative supplies of fuel and air to a combustion process to maintain the temperature of the combustion process at a maximum value, means for controlling the supply of fuel to the combustion process, means for controlling the supply of air to the combustion process, first motor means for cycling at a predetermined rate said means for controlling the supply of air to the combustion process, balanceable means including a temperature responsive member and a rebalancing member, said temperature response member being responsive to the temperature of said combustion process and capable of unbalancing said balanceable means upon a change in the temperature of said combustion process, relatively slow driving means responsive to the unbalance of said balanceable means connected in controlling relation to said rebalancing member for rebalancing said balanceable means, second motor means responsive to the unbalance of said balanceable means for additionally controlling said means for controlling the supply of air to the combustion process, and reversing means connected to said second motor means for reversing the effect of said balanceable means on said second motor means.

10. In control apparatus for controlling the relative supplies of materials to a process to maintain the output of the process at a maximum, means for controlling the supply of one of said materials, means including electrical phase sensitive actuator means for variably controlling the supply of another of said materials, means for cyclically varying at a predetermined rate the supply of one of said materials relative to the supply of the other of said materials, balanceable means having a responsive element sensitive to the output of said process and also including a slow acting rebalancing member for adjusting said balanceable means to a state of equilibrium when a change in the output of said process causes an unbalance, means connecting said balanceable means in controlling relation to said phase sensitive actuator means, electrical reversible switching means, and means connecting said electrical switching means to said phase sensitive actuator in such a manner that when the cycling of the supply of one of said materials relative to the supply of the other of said materials results in a cyclic change in the output of the process having the same phase the supply of said one of the materials will be increased.

11. In control apparatus for controlling the relative supplies of fuel and air to a combustion process, means for controlling the supply of fuel, means including a phase sensitive actuator means for controlling the proportional supplies of fuel and air, means for cyclically controlling at a predetermined rate the supply of air, a balanceable electrical network circuit, a temperature responsive impedance element responsive to the temperature of said process connected in one leg of said network circuit, a variable impedance connected in an adjacent leg of said network circuit, slow operating motor means responsive to the unbalance of said network circuit for adjusting said variable impedance to rebalance said network circuit, means connecting said network circuit in controlling relation to said phase sensitive actuator means, and reversing means connected to said phase sensitive actuator means.

12. In control apparatus for controlling the relative magnitudes of at least two variables affecting a process to maintain the output of the process at a maximum, means for controlling the magnitude of one of said variables, means including electrical phase sensitive actuator means for variably controlling the supply of another of said variables, means for cyclically varying at a predetermined rate the magnitude of one of said variables relative to the magnitude of the other of said variables, balanceable means having a responsive element sensitive to the output of said process and also including a slow acting rebalancing member for adjusting said balanceable means to a state of equilibrium when a change in the output of said process causes an unbalance, means connecting said balanceable means in controlling relation to said phase sensitive actuator means, electrical control means, and means connecting said electrical control means to said phase sensitive actuator in such a manner that when the cycling of the magnitude of one of said variables relative to the magnitude of the other of said variables results in a cyclic change in the output of the process having the same phase, the magnitude of said one of the variables will be increased.

WALDO H. KLIEVER.

References Cited in the file of this patent

UNITED STATES PATENTS

| Number | Name | Date |
|---|---|---|
| 2,052,375 | Wunsch | Aug. 25, 1936 |
| 2,148,491 | Moore | Feb. 28, 1939 |
| 2,220,028 | Smith | Oct. 29, 1940 |
| 2,275,317 | Ryder | Mar. 3, 1942 |
| 2,352,143 | Wills | June 20, 1944 |